(12) United States Patent
Figenschou

(10) Patent No.: US 8,653,361 B2
(45) Date of Patent: Feb. 18, 2014

(54) UMBILICAL

(75) Inventor: Arild Figenschou, Billingstad (NO)

(73) Assignee: Aker Kvaerner Subsea AS, Lysaker (NO)

( * ) Notice: Subject to any disclaimer, the term of this patent is extended or adjusted under 35 U.S.C. 154(b) by 259 days.

(21) Appl. No.: 12/813,143

(22) Filed: Jun. 10, 2010

(65) Prior Publication Data

US 2010/0243289 A1    Sep. 30, 2010

Related U.S. Application Data

(63) Continuation of application No. 11/628,662, filed on Dec. 6, 2006, now Pat. No. 7,754,966.

(30) Foreign Application Priority Data

Jun. 18, 2004  (NO) .................................... 20042557
Oct. 28, 2004  (NO) .................................... 20044671

(51) Int. Cl.
*H01B 7/04* (2006.01)

(52) U.S. Cl.
USPC ........................................................... 174/47

(58) Field of Classification Search
USPC ............................. 174/47; 166/367; 405/169
See application file for complete search history.

(56) References Cited

U.S. PATENT DOCUMENTS

| 4,196,307 A | 4/1980 | Moore et al. |
| 4,462,717 A | 7/1984 | Falcimaigne et al. |
| 4,569,392 A | 2/1986 | Peterman |
| 5,813,106 A | 9/1998 | Haug et al. |
| 6,046,404 A | 4/2000 | Figenschou et al. |
| 6,239,363 B1 | 5/2001 | Wooters |
| 6,472,614 B1 | 10/2002 | Dupont et al. |
| 6,612,370 B1 | 9/2003 | Jahnsen et al. |
| 6,940,054 B1 | 9/2005 | Heggdal |
| 7,754,966 B2 * | 7/2010 | Figenschou ..................... 174/47 |
| 2005/0061538 A1 | 3/2005 | Blucher |
| 2007/0253778 A1 | 11/2007 | Figenschou |

FOREIGN PATENT DOCUMENTS

| GB | 1 203 355 A | 8/1970 |
| GB | 2 258 940 A | 2/1993 |
| GB | 2 326 177 A | 12/1998 |
| GB | 2 326 758 A | 12/1998 |
| WO | WO 93/17176 A1 | 9/1993 |
| WO | WO 99/57413 A1 | 11/1999 |
| WO | WO 02/057560 A1 | 7/2002 |

* cited by examiner

*Primary Examiner* — Chau Nguyen
(74) *Attorney, Agent, or Firm* — Birch, Stewart, Kolasch & Birch, LLP

(57) ABSTRACT

An umbilical for transfer of fluids and electric current/signals between the sea surface and equipment deployed on the sea bed, in particular in deep waters, is disclosed. The umbilical comprises a number of pipes and electric conductors/wires collected in a bundle, a filler material lying at least partly around and between the pipes and the conductors/wires, and a protective sheath enclosing the pipes, conductors/wires and filler material. The load carrying elements of the umbilical are light weighted rods of composite material that can either be collected in bundles or appear individually or in a combination thereof.

10 Claims, 5 Drawing Sheets

UMBILICAL

This application is a continuation of U.S. Ser. No. 11/628,662, filed Dec. 6, 2006 now U.S. Pat. No. 7,754,966.

BACKGROUND OF THE INVENTION

The present invention relates to an umbilical for transmission of fluids and electric current/signals between the sea surface and equipment located on the sea bed, in particular in deep waters, comprising a number of pipes and electric conductors/wires collected in a bundle, a filler material arranged at least partly around and between the pipes and conductors/wires, and a protective sheath enclosing the pipes, conductors/wires and filler material.

Umbilicals of this type are constructed as a composed structure which is able to transfer hydraulic liquids, chemicals, fluids, electric and optical signals and electric power between equipment on the sea bed and on the sea surface. An early version of such umbilicals is known from WO 93/17176. Typical for this umbilical is that most of the load transfer takes place in a centrally located steel pipe of substantial dimension. Further examples of prior art are disclosed in GB 2 326 177 A and GB 2 326 758 A, all having the same assignee as the present invention.

An International patent application no. PCT/N005/00215 related to a power umbilical is simultaneously filed.

The above mentioned heavy section steel pipes add substantial weight to the umbilical due to their own weight. The pipes need to have such large dimensions just because they act as load carrying elements, and not because the transported medium requires this. Thus the sea depth to which the umbilical having the traditional construction can be used is limited.

Instantly, it appears that steel rope could be used as load carrying elements. This, however, does not solve the problem to a considerable extent. Steel rope also add substantial weight and in combination with heavy pipes, one does not reach large depths before the umbilical achieves yield stresses and is torn off due to its own weight.

Substantial efforts and resources have been used in order to find a solution on how to be able to use these umbilicals down to the sea bed at real large sea depths, such as 2500 meters and more.

This is now solved by combining a technology that is developed by the assignee of the present invention, viz. the technology that is used for tension legs of floating platforms. See for example WO 02/057560 A1.

Thus, according to the present invention an umbilical of the introductory said kind is provided, which is distinguished in that the umbilical comprises separate load carrying elements, which load carrying elements are light weighted rods of composite material. The light weight rods of composite material may preferably be carbon rods having embedded strength fibers. The rods can either be collected in bundles or appear individually or in a combination thereof.

Composite material has that excellent property that the material has approx. the same load carrying capacity as steel, at the same time as the weigh is reduced to about 10% of that of steel. Thus the load carrying elements do not contribute substantially to the total weight of the umbilical which thereby provides an option to use the umbilical in deep waters. One may get so much deeper as the weight reduction allows. A typical example of composite material is carbon rods having embedded strength fibers.

In one embodiment the filler material, the pipes and conductors/wires can be laid in a helix or spiral configuration about the longitudinal axis of the umbilical.

In a second embodiment the filler material, the pipes and conductors/wires can be laid in a substantially rectilinear configuration without any essential twisting or spiraling.

The load carrying elements can be collected in a twisted or spiraling bundle that is located centrally as a core element within the umbilical.

As an alternative the load carrying elements of the umbilical can be distributed to a number of bundles located peripheral relative to the longitudinal axis of the umbilical.

As an alternative the umbilical can also include weight elements in order to ad mass/weight to the umbilical, either in all its extent or in some sections.

The filler material, the pipes and the conductors/wires can be laid in several layers viewed in radial direction.

In one embodiment the load carrying elements can consist of single rods that are distributed within the transversal cross section, and some may possibly be located adjacent to each other without thereby being collected in a bundle.

Even if not strictly necessary, the filler material will in a suitable embodiment be in the form of elongated channel elements that are able to at least partly enclose the respective pipes and cables in order to keep these in position relative to each other.

Other and further objects, features and advantages will appear from the following description of preferred embodiments of the invention, which are given for the purpose of description, and given in context with the appended drawings where:

DETAILED DESCRIPTION OF THE INVENTION

It is to be understood that it is possible with two variants of the transversal cross section of the umbilicals shown in FIG. 1-9, which do not appear from the figures, namely one where the individual elements of the umbilical are lying with a certain laying length about the longitudinal axis of the umbilical, and one variant where the individual elements are lying more or less in a straight line substantially parallel to the longitudinal axis of the umbilical. For the detailed construction of a traditional umbilical and how it can be manufactured reference is given to the previously mentioned publication WO 93/17176.

Figure 1:
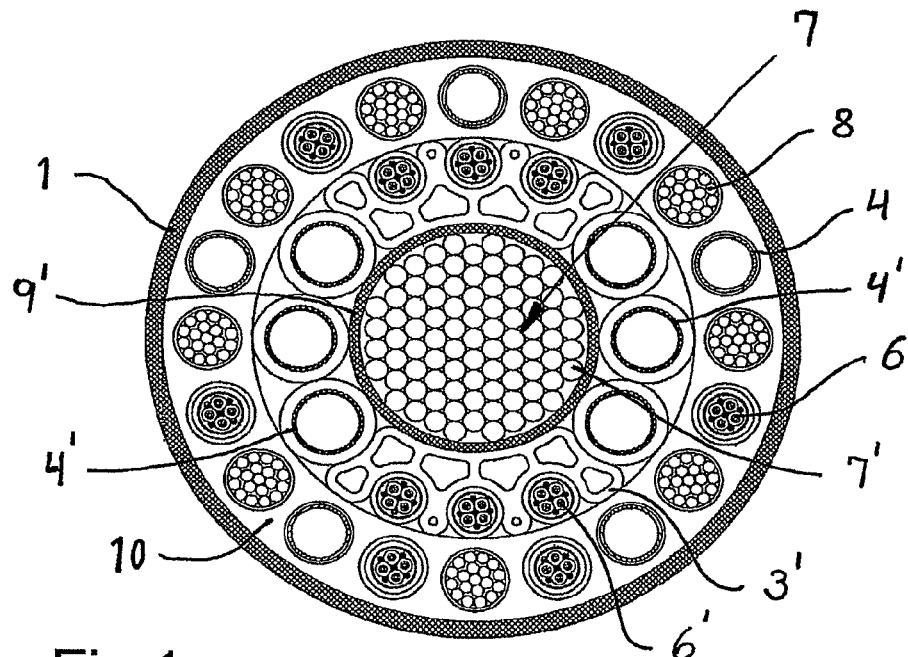
FIG. 1 shows a transversal cross section through a first embodiment of the umbilical according to the invention having load carrying elements centrally located.
Figure 2:
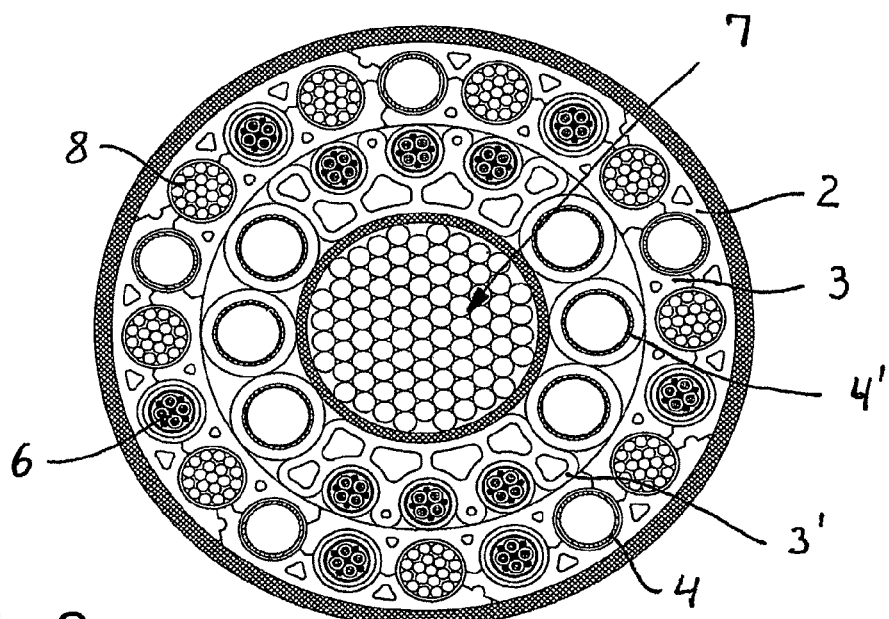
FIG. 2 shows a transversal cross section through a second embodiment of the umbilical according to the invention.
Figure 3:
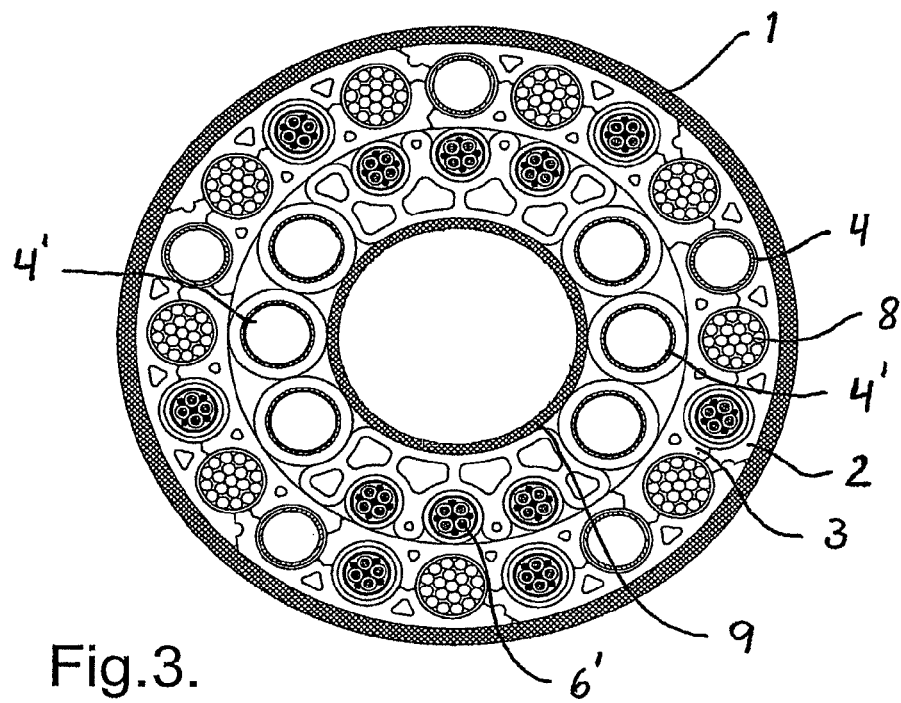
FIG. 3 shows a transversal cross section through another embodiment of the umbilical according to the invention having several load carrying elements peripherally located.

The umbilical according to FIG. 1 is basically constructed of the following elements: load carrying element 7 consisting of a bundle of rods 7' of composite material, inner channel elements 3', for example of polyvinylchloride (PVC), electric conductors/wires 6, 6', fluid pipes 4, 4' normally made of steel, weight elements 8, or further strength elements 8, for example in the form of steel rope, and an outer sheath 1, for example of polyethylene (PE). The reference number 9' can denote a friction material, like a rubber sheath, lying around the load carrying element 7. The reference number 9 can denote a pipe having larger diameter than the fluid pipes 4, 4' as illustrated in FIG. 3. The reference number 10 represents a filler substance different from the channel elements 3' and can be a foam substance or similar. In a practical embodiment the rods 7' are carbon rods having embedded strength fibers. The diameter of such rods is in order of magnitude 6 mm without such dimension should be interpreted as any limitation.

The umbilical according to FIG. 2-6 is basically constructed of the following elements: load carrying element 7 consisting of a bundle of rods 7' of composite material, inner channel elements 3', intermediate channel elements 3, outer channel elements 2, electric conductors/wires 6, 6', fluid pipes 4, 4' normally made of steel, weight elements 8, or further strength elements 8, for example in the form of steel rope, and an outer sheath 1. The reference number 9' can denote a friction material, like a rubber sheath, lying around the load carrying element 7.

Figure 4:
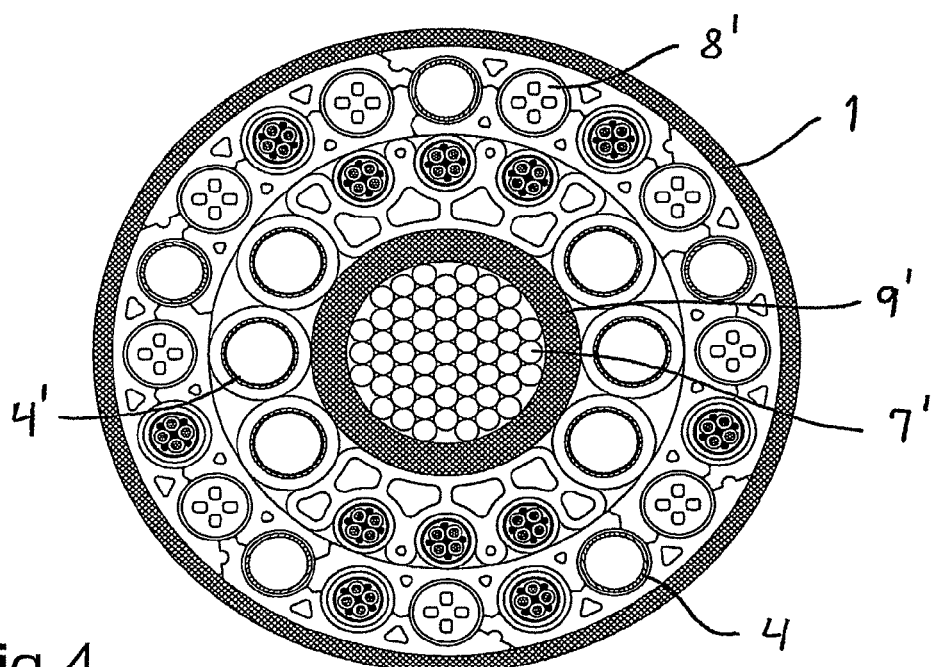
FIG. 4 shows a transversal cross section through another embodiment of the umbilical according to the invention having the load carrying element centrally located.
Figure 5:
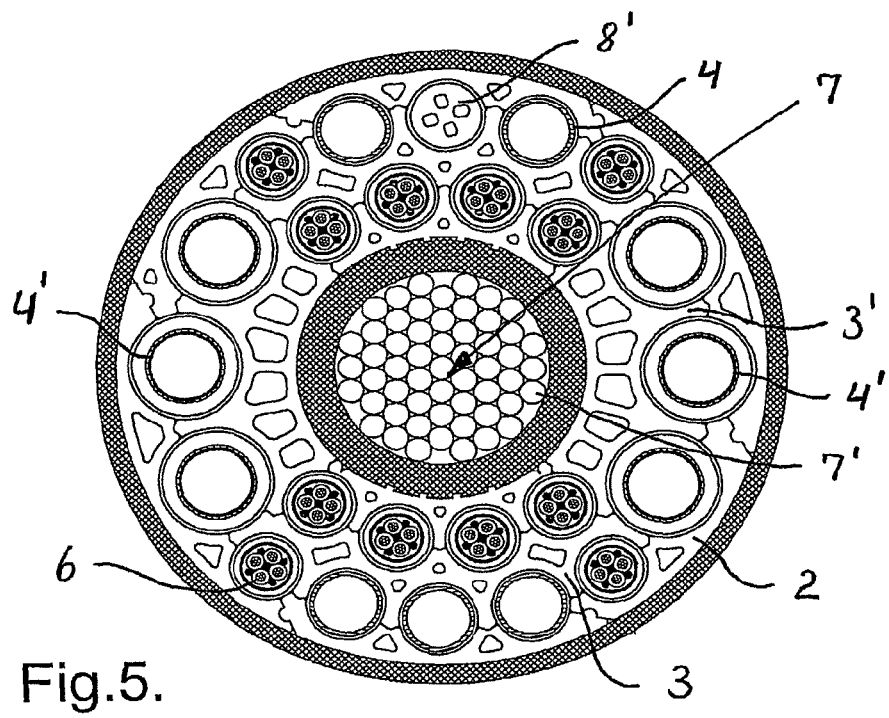
FIG. 5 shows a transversal cross section through still another embodiment of the umbilical according to the invention having the load carrying element centrally located.
Figure 6:
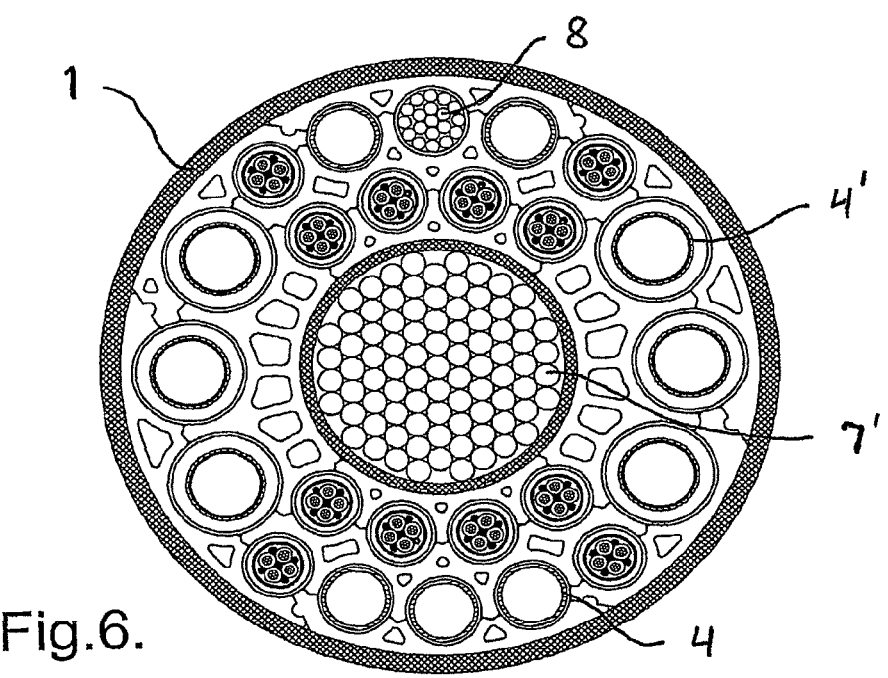
FIG. 6 shows a transversal cross section through still another embodiment of the umbilical according to the invention having the load carrying element centrally located.

These elements are repeatedly found in most of the figures and are denoted with the same reference number in the respective figures. However, it is to be noted that FIGS. 4 and 5 are omit the weight elements/strength elements 8 which are replaced with PVC profiles 8'. FIG. 6 shows one single weight element 8.

Figure 7:
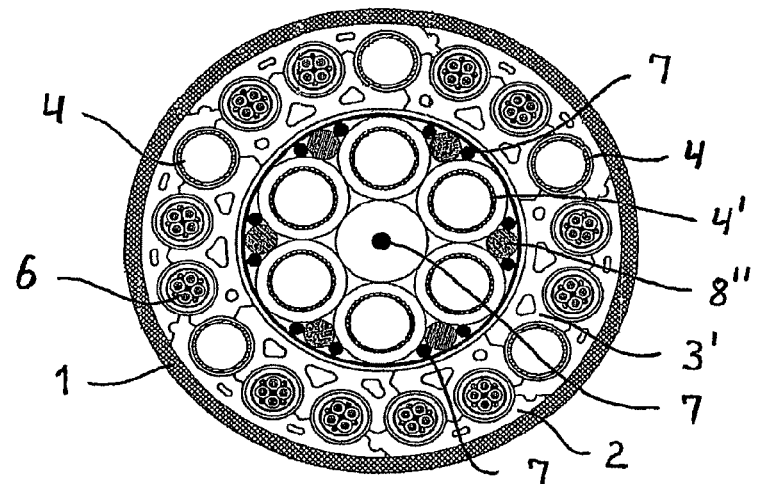
FIG. 7 shows a transversal cross section through still another embodiment of the umbilical according to the invention having the load carrying element centrally located.

FIG. 7 shows in particular a variant having a somewhat smaller cross sectional area, but with a set of fluid pipes 4 collected centrally about one single load carrying element 7 and a number of load carrying elements 7 in the form of single rods distributed about the fluid pipes 4. In between the single rods can weight elements 8 be placed, here typically rods 8" made of lead. Further it has conductors/wires 6, 6', an outer set of fluid pipes 4', channel elements 2, 3 and an outer sheath 1. This provides a compact umbilical requiring less space.

Figure 8:
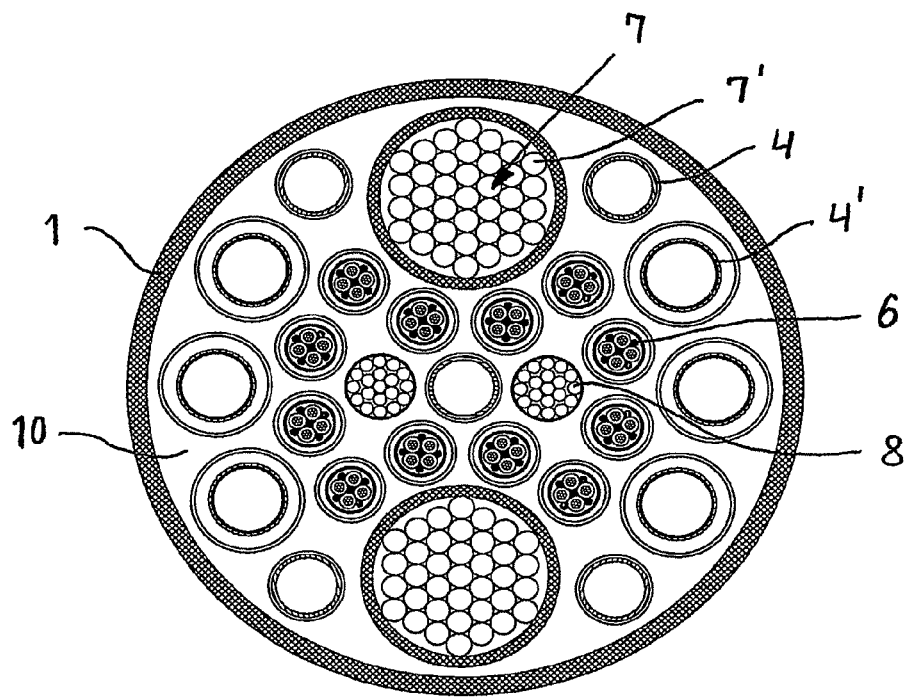
FIG. 8 shows a transversal cross section through a variant of the umbilical according to the invention without the characteristic elongated channel elements.

FIG. 8 shows another particular variant of the umbilical where channel elements are not used, but a filler substance 10 such as a foam substance. Otherwise it has the remainder elements as above described, though differently located in the cross section.

Figure 9:
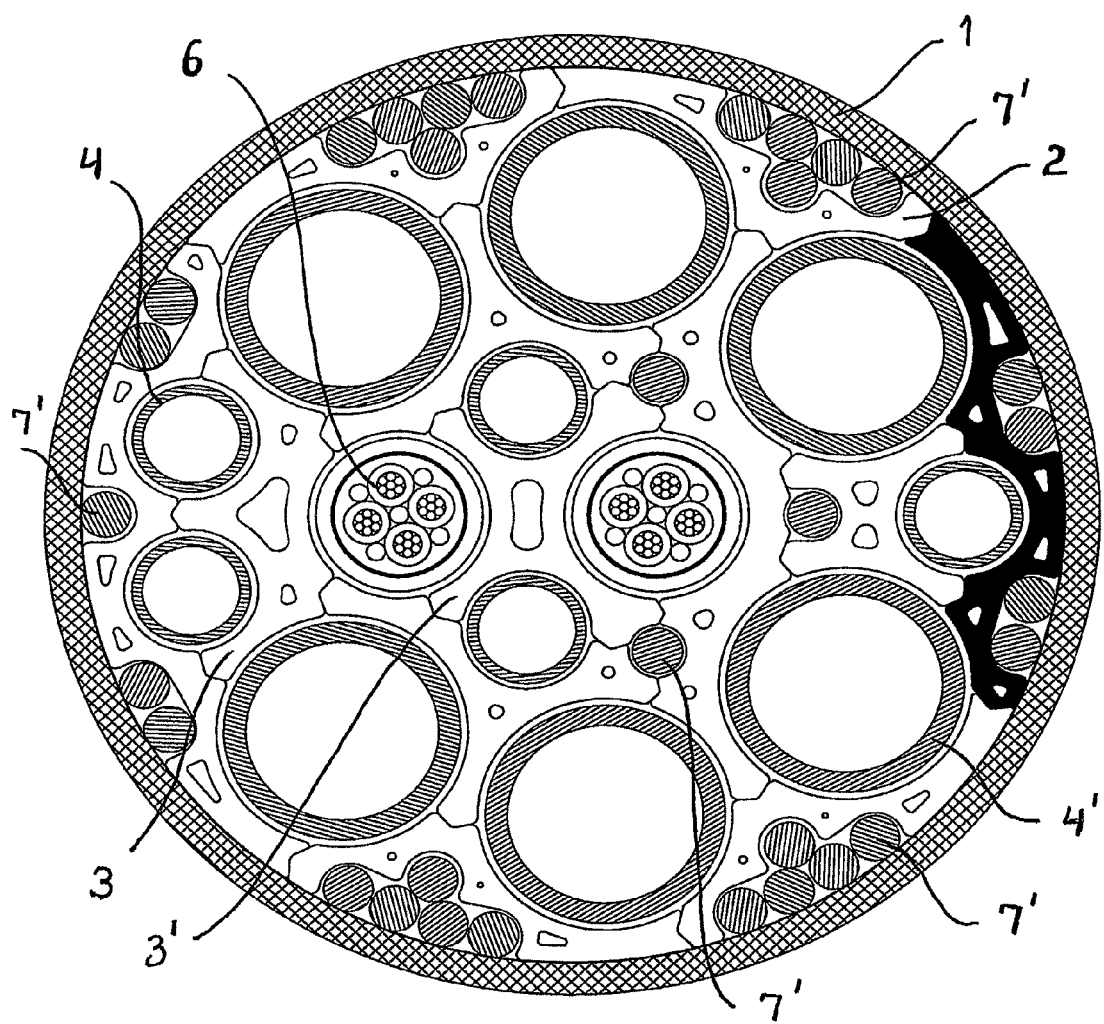
FIG. 9 shows a transversal cross section through a variant of the umbilical according to the invention where the load carrying elements consist of a number of individual rods that are not collected in a bundle.

FIG. 9 shows in particular a variant of an umbilical having a pronounced different transversal cross section, having some larger fluid pipes 4', some smaller fluid pipes 4, some smaller conductors/wires 6 and a number of load carrying elements 7 which are in the form of individual rods 7' and not bundles of rods. Moreover, it has channel elements 2, 3, 3' extending all the way in to the centre of the umbilical, and an outer sheath 1. This provides an umbilical that is easier and less expensive to manufacture.

What is claimed is:

1. An umbilical for transmission of fluids and electric current/signals from the sea surface to equipment arranged on the sea bed, said umbilical being adapted for use at depths where umbilicals having metal load carrying elements and fluid pipes and ropes can create yield stresses that cause the metal load carrying elements to be torn off, said umbilical comprising:
   a plurality of said fluid pipes, said plurality of fluid pipes being configured for transmission of fluid from the sea surface to equipment arranged on the sea bed;
   electric conductors/wires collected in a bundle;
   a filler material arranged at least partly around and between the plurality of fluid pipes and the electric conductors/wires;
   a protective sheath enclosing the plurality of fluid pipes, electric conductors/wires and filler material, material; and
   separate load carrying elements, said separate load carrying elements being light weighted rods of composite material having embedded strength fibers,
   wherein the filler material, the light weighted rods of composite material having embedded strength fibers, the plurality of fluid pipes and the electric conductors/wires are laid in a helix configuration about a longitudinal axis of the umbilical, and
   wherein there are no fluid pipes configured for transmission of fluid from the sea bed to the sea surface included in the umbilical,
   wherein the light weighted rods comprise light weighted rods located at a perimeter of the umbilical and in contact with the protective sheath, the perimeter light weighted rods being formed from composite material having embedded strength fibers.

2. The umbilical according to claim 1, wherein the light weighted rods of the umbilical are distributed in a number of bundles located peripheral relative to the longitudinal axis of the umbilical.

3. The umbilical according to claim 1, wherein the embedded strength fibers are carbon fibers.

4. The umbilical according to claim 1, wherein the perimeter light weighted rods comprise individual light weighted rods, each of said individual light weighted rods being formed from a single strand of composite material having embedded strength fibers, said single strand not being in contact with other light weighted rods.

5. An umbilical for transmission of fluids and electric current/signals from the sea surface to equipment arranged on the sea bed, said umbilical being adapted for use at depths where umbilicals having metal load carrying elements and fluid pipes and ropes can create yield stresses that cause the metal load carrying elements to be torn off, said umbilical comprising:
   a plurality of said fluid pipes, said plurality of fluid pipes being configured for transmission of fluid from the sea surface to equipment arranged on the sea bed;
   electric conductors/wires collected in a bundle;
   a filler material arranged at least partly around and between the plurality of fluid pipes and the electric conductors/wires;
   a protective sheath enclosing the plurality of fluid pipes, electric conductors/wires and filler material, material; and
   separate load carrying elements, said separate load carrying elements being light weighted rods of composite material having embedded strength fibers,
   wherein the filler material, the light weighted rods of composite material having embedded strength fibers, the plurality of fluid pipes and the electric conductors/wires are laid in a helix configuration about a longitudinal axis of the umbilical, and wherein there are no fluid pipes configured for transmission of fluid from the sea bed to the sea surface included in the umbilical, wherein the light weighted rods comprise individual light weighted rods located at a spaced location from the longitudinal axis of the umbilical, each of said individual light weighted rods being formed from a single strand of composite material having embedded strength fibers, said single strand not being in contact with other light weighted rods.

6. The umbilical according to claim 5, wherein the light weighted rods of the umbilical are distributed in a number of bundles located peripheral relative to the longitudinal axis of the umbilical.

7. The umbilical according to claim 5, wherein the embedded strength fibers are carbon fibers.

8. An umbilical for transmission of fluids and electric current/signals from the sea surface to equipment arranged on the sea bed, said umbilical being adapted for use at depths where umbilicals having metal load carrying elements and fluid pipes and ropes can create yield stresses that cause the metal load carrying elements to be torn off, said umbilical comprising:

a plurality of said fluid pipes, said plurality of fluid pipes being configured for transmission of fluid from the sea surface to equipment arranged on the sea bed;

electric conductors/wires collected in a bundle;

a filler material arranged at least partly around and between the plurality of fluid pipes and the electric conductors/wires;

a protective sheath enclosing the plurality of fluid pipes, electric conductors/wires and filler material, material; and separate load carrying elements, said separate load carrying elements being light weighted rods of composite material having embedded strength fibers, wherein the filler material, the light weighted rods of composite material having embedded strength fibers, the plurality of fluid pipes and the electric conductors/wires are laid in a helix configuration about a longitudinal axis of the umbilical, and wherein there are no fluid pipes configured for transmission of fluid from the sea bed to the sea surface included in the umbilical, wherein each of the light weighted rods is formed from a single strand of composite material having embedded strength fibers, and wherein there are a plurality of groups of light weighted rods, each of the plurality of groups of light weighted rods having five or less strands, and each of the plurality of groups being separated from each other by channel elements.

9. The umbilical according to claim 8, wherein the light weighted rods of the umbilical are distributed in a number of bundles located peripheral relative to the longitudinal axis of the umbilical.

10. The umbilical according to claim 8, wherein the embedded strength fibers are carbon fibers.

* * * * *